(12) United States Patent
Boyle et al.

(10) Patent No.: US 8,055,592 B2
(45) Date of Patent: Nov. 8, 2011

(54) CLUSTERING DATA OBJECTS

(75) Inventors: Peter Currie Boyle, Burnaby (CA); Yu Zhang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 11/828,416

(22) Filed: Jul. 26, 2007

(65) Prior Publication Data

US 2008/0077572 A1    Mar. 27, 2008

(30) Foreign Application Priority Data

Aug. 1, 2006 (CA) ........................... 2554951

(51) Int. Cl.
*G06F 15/18* (2006.01)
(52) U.S. Cl. .................................. 706/12; 706/18
(58) Field of Classification Search .................. None
See application file for complete search history.

(56) References Cited

U.S. PATENT DOCUMENTS

| | | |
|---|---|---|
| 6,792,448 B1 | 9/2004 | Smith |
| 7,000,194 B1 | 2/2006 | Newbold |
| 2001/0018698 A1 | 8/2001 | Uchino et al. |
| 2002/0188681 A1 | 12/2002 | Gruen et al. |
| 2003/0131055 A1 | 7/2003 | Yashchin et al. |

FOREIGN PATENT DOCUMENTS

EP    1209849 B1    3/2007

OTHER PUBLICATIONS

Friburger et al., N., "Textual Similarity based on Proper Names", pp. 1-10, 2002.*
Lin et al., D., "Induction of Semantic Classes from Natural Language Text", KDD 01, pp. 317-322, 2001.*
Freudenberg et al., J., "A similarity-based method for genome-wide prediction of disease-relevant human genes", Bioinformatics vol. 18, Suppl, pp. S110-S115, 2002.*
Wen et al., J., "Query Clustering Using User Logs", ACM Transactions on Information Systems, vol. 20, No. 1, pp. 59-81, Jan. 2002.*
Resnik, P., "Semantic Similarity in a Taxonomy: An Information-Based Measure and its Application to Problems of Ambiguity in Natural Language", Journal of Artificial Intelligence Research 11, pp. 95-130, 1999.*

(Continued)

*Primary Examiner* — Jeffrey A Gaffin
*Assistant Examiner* — Adrian Kennedy
(74) *Attorney, Agent, or Firm* — A. Bruce Clay

(57) ABSTRACT

A system for clustering data objects includes a module for calculating an importance value of at least one member in a first data object represented as a variable length vector of 0 to N members and a clustering module for dynamically forming a plurality of clusters containing one or more data objects. The clustering module is configured to associate the first data object with at least one of the plurality of clusters in dependence upon the at least one member's similarity value in comparison to members in other data objects. The clustering module may be configured to cluster the first data object into a plurality of clusters if it has at least two members and each member belongs to a different cluster.

7 Claims, 8 Drawing Sheets

OTHER PUBLICATIONS

Benkhalifa et al., M., "Integrating WordNet Knowledge to Supplement Training Data in Semi-Supervised Agglomerative Hierarchical Clustering for Text Categorization", Journal of Intelligent Systems vol. 16, pp. 929-947, 2001.*

Torra et al., V., "Exploration of Textual Document Archives Using A Fuzzy Hierarchical Clustering Algorithm in the GAMBAL System", Information and Processing Management 41, pp. 587-598, Mar. 2004.*

Jannink, J. "Thesaurus Entry Extraction from an On-line Dictionary", Stanford University, pp. 1-9, 1999.*

Jin et al., S., "Study of Automatic Abstracting Based on Corpus and Hierarchical Dictionary", Journal of Software, pp. 308-314, 2000.*

Brooks et al., C., "Improved Annotation of the Blogosphere via Autotagging and Hierarchical Clustering", WWW 2006, pp. 625-631, May 2006.*

Li, et al, Real-time topics extraction and visualization in online discussions, Proceedings of 2002 International Conference on Machine Learning and Cybernetics (Cat.No. 02EX583), 2002, pt. 2, p. 928-33 vol. 2 ISBN: 0 7803 7508 4.

Loh, et al., Analyzing Web chat messages for recommending items from a digital library, ICEIS 2004—Proceedings of the Sixth International Conference on Enterprise Information Systems, ICEIS 2004—Proceedings of the Sixth International Conference on Enterprise Information Systems, 2004, p. 41-48, ISBN: 9728865007.

Pimental, et al., Co-text loss in textual chat tools, Lecture Notes in Artificial Intelligence (Subseries of Lecture Notes in Computer Science), v 2680, Modeling and Using Context, 2003, p. 483-490, ISSN: 0302-9743 CODEN: LNAIE4.

\* cited by examiner

CLUSTERING DATA OBJECTS

COPYRIGHT NOTICE

A portion of the disclosure of this patent document contains material which is subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND OF THE INVENTION

This invention relates to clustering data objects.

There are numerous situations where the clustering of data objects may be desirable. For example, instant messaging and chat systems may present text entries by users as a continuous stream of intermixed threads. When a number of users are participating concurrently in a chat session, there may be multiple threads covering different topics. For example, in an online group chat session, the discussion may start around a hobby and then quickly evolve to include discussions about other topics such as finance or sports. In this stream of intermixed threads, the questions, responses and comments may bounce back and forth between users and between different topics. A log of these intermixed threads may be difficult to follow, particularly for a new user joining the chat session with no previous context.

Various approaches to organizing data objects have been proposed, but improvements are needed.

BRIEF SUMMARY

According to one embodiment of the present invention, a method for unsupervised clustering data objects, comprises calculating, with a processor, based on a relative depth in a semantic hierarchical tree of a dictionary, an importance value of at least one member in a first data object represented as a variable length vector of 0 to N members. The vector further comprises a subset of the members having an importance value above a designated importance threshold, wherein the data objects comprise sentences and the members comprise words, therein. Based on a path distance in the semantic hierarchical tree of a dictionary, a member similarity value is calculated for each member of the subset of the members to at least a second data object. When none of the subset of the members of the first data object are associated with at least one of a subset of members of the at least a second data object, in dependence upon a comparison of similarity values, a first cluster comprising the first data object is dynamically formed with a clustering module. When at least one of the subset of the members of the first data object is associated with at least one of a subset of members of the at least a second data object, in dependence upon a comparison of similarity values, at least a second cluster comprising the first data object and the at least a second data object is dynamically formed with the clustering module.

According to one embodiment of the present invention, a computer program product for unsupervised clustering of data objects, comprises a computer usable medium having computer usable program code embodied therewith. The computer usable program code comprises computer usable program code configured to calculate, based on a relative depth in a semantic hierarchical tree of a dictionary, an importance value of at least one member in a first data object represented as a variable length vector of 0 to N members. The vector further comprises a subset of the members having an importance value above a designated importance threshold, wherein the data objects comprise sentences and the members comprise words, therein. Computer usable program code is configured to calculate, based on a path distance in the semantic hierarchical tree of a dictionary, a member similarity value for each member of the subset of the members to at least a second data object. When none of the subset of the members of the first data object are associated with at least one of a subset of members of the at least a second data object, in dependence upon a comparison of similarity values, computer usable program code is configured to dynamically form, with a clustering module, a first cluster comprising the first data object. When at least one of the subset of the members of the first data object is associated with at least one of a subset of members of the at least a second data object, in dependence upon a comparison of similarity values, computer usable program code is configured to dynamically form, with the clustering module, at least a second cluster comprising the first data object and the at least a second data object.

According to one embodiment of the present invention, a method for unsupervised clustering of data objects, comprises calculating, with a processor, based on a relative depth in a semantic hierarchical tree of a dictionary, an importance value of at least one member in a first data object represented as a variable length vector of 0 to N members. The vector further comprises a subset of the members having an importance value above a designated importance threshold, wherein the data objects comprise sentences of an electronic messaging system and the members comprise words, therein. A path distance is calculated in the semantic hierarchical tree of a dictionary, and a member similarity value is calculated for each member of the subset of the members to at least a second data object. When none of the subset of the members of the first data object are associated with at least one of a subset of members of the at least a second data object, in dependence upon a comparison of similarity values, a first cluster comprising the first data object is dynamically formed with the clustering module. When at least one of the subset of the members of the first data object is associated with at least one of a subset of members of the at least a second data object, in dependence upon a comparison of similarity values, at least a second cluster comprising the first data object and the at least a second data object is dynamically formed with the clustering module.

DETAILED DESCRIPTION OF THE INVENTION

Figure 1:
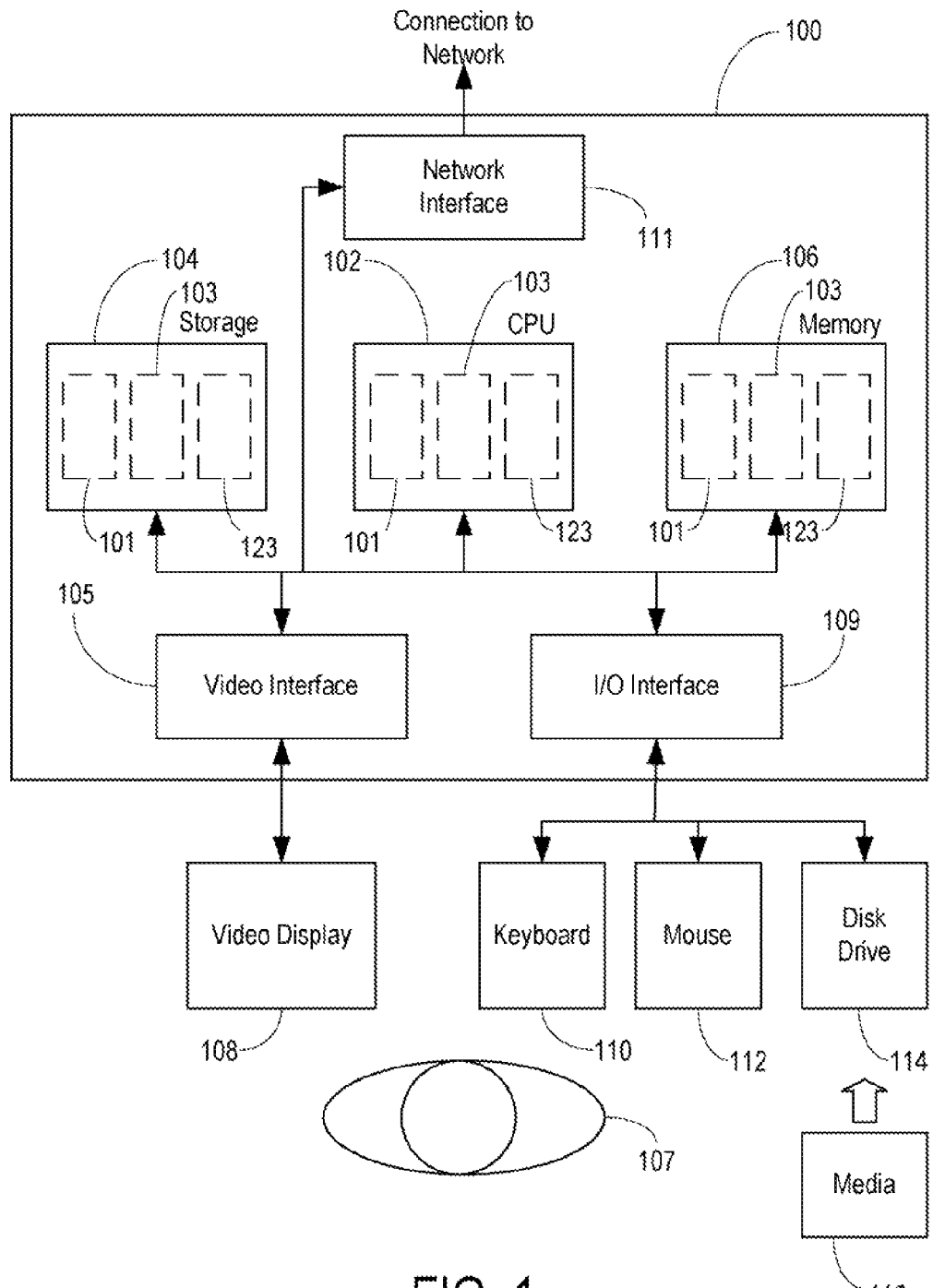
FIG. 1 shows a generic data processing system that may provide a suitable operating environment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A suitably configured data processing system, and associated communications networks, devices, software and firmware may provide a platform for enabling one or more of embodiments. By way of example, FIG. 1 shows a generic data processing system 100 that may include a central processing unit ("CPU") 102 connected to a storage unit 104 and to a random access memory 106. The CPU 102 may process instructions included in an operating system 101 or an application program 103 and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected through an I/O interface 109. In known manner, the mouse 112 may be configured to control movement of a cursor in the video display 108, and to operate various GUI controls appearing in the video display 108 with a mouse button. The disk drive 114 may be configured to accept data processing system readable media 116. The data processing system 100 may be connected to a network via a network interface 111, allowing the data processing system 100 to communicate with other suitably configured data processing systems (not shown). The particular configurations shown by way of example in this specification are illustrative and not meant to be limiting.

The clustering of data objects may be defined as a process of organizing the data objects into groups whose members are similar in some way. A cluster is therefore a collection of data objects which are similar as between themselves and which are dissimilar to data objects belonging to other clusters.

Data clustering algorithms may be generally characterized as hierarchical or partitional. Hierarchical clustering proceeds successively by either merging smaller clusters into larger ones, or by splitting larger clusters into smaller ones. The clustering methods may differ in terms of the rule by which it is decided which smaller clusters are merged or which large cluster is split. The end result of a hierarchical data clustering algorithm is typically a tree of clusters, also known as a dendrogram, which shows how the clusters are related. By cutting the dendrogram at a desired branch level, a clustering of the data items into disjoint groups may be obtained. Partitional data clustering algorithms, on the other hand, attempt to directly decompose the data set into a set of disjoint clusters. The clustering algorithm may, for example, try to emphasize the local structure of data objects by assigning clusters to peaks in a probability density function. Typically the clustering criteria may involve minimizing some measure of dissimilarity in the samples within each cluster, while maximizing the dissimilarity of different clusters.

In an embodiment of the present invention, a partitional approach is used, and each data object is viewed as a group or a set that may have a variable number of members. By measuring a member's similarities with other groups' members, the clustering algorithm of the present invention may dynamically classify a data object into an existing cluster, or if necessary create an entirely new cluster. A member similarity-based clustering algorithm may then be used to cluster the data objects based on similarities between members of the data objects. Upon completion of clustering, context threads may be formed and hyper-linked to corresponding data objects. A specific example of a chat system will be used to further illustrate the present invention, wherein a textual message represents a data object, and certain words in the textual message represent the members of the data object. However, it will be appreciated that the present invention may be applied to various other applications.

Figure 2A:
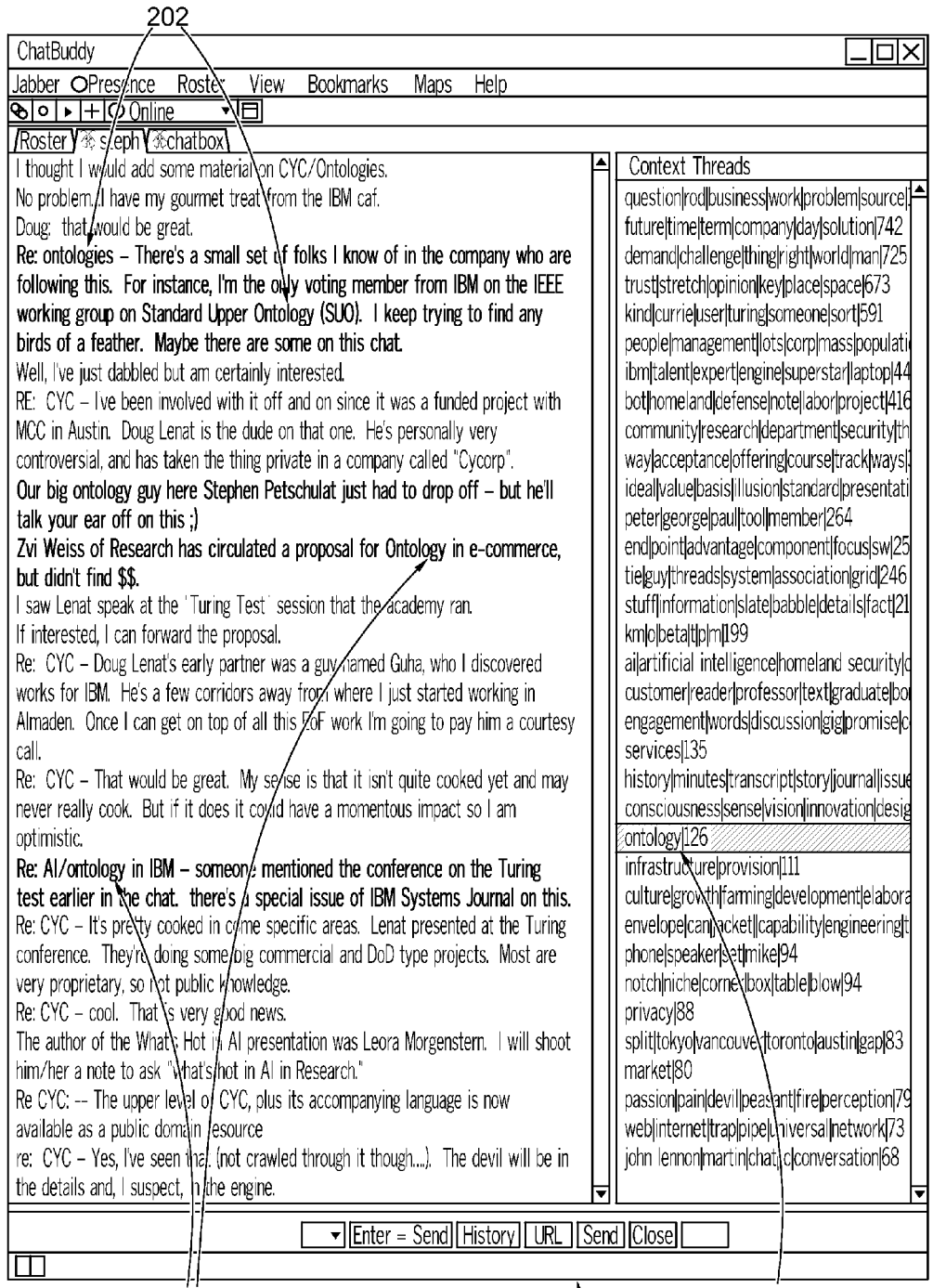
FIG. 2A shows a graphical user interface (GUI) of an illustrative chat session in accordance with an embodiment.
Figure 2B:
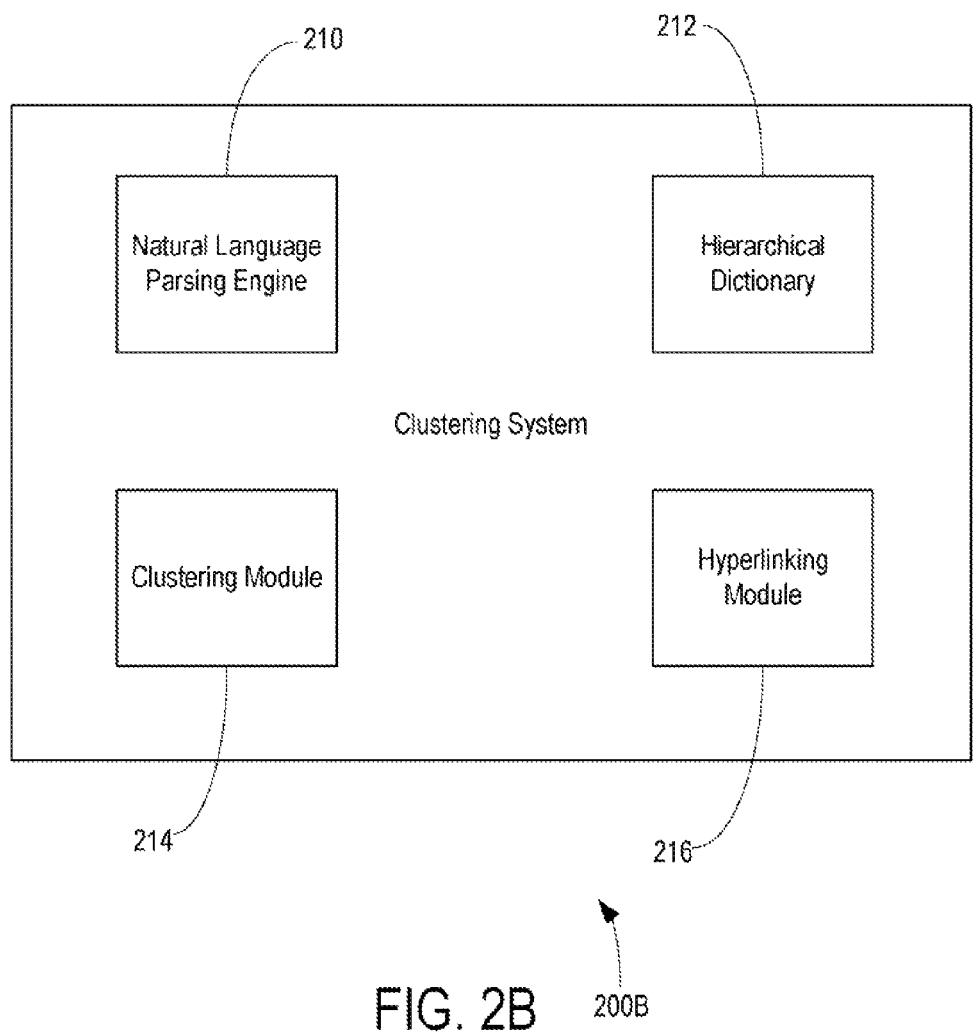
FIG. 2B shows a schematic block diagram of a clustering system in accordance with an embodiment.

Referring to FIGS. 2A and 2B, shown is a sample GUI screen 200A of an illustrative clustering system 200B. In an embodiment, this illustrative clustering system 200B may include a number of components. First, a natural language parsing engine 210 may be used to get a list of words or phrases from each chat message 202 appearing in the main window of FIG. 2A. Second, a hierarchical dictionary 212 may be used to evaluate a similarity distance between the words or phrases (i.e. members). Third, a member similarity-based clustering module 214 may be used to classify the chat messages into different context threads 204 of FIG. 2A. Fourth, these context threads 204 may be hyperlinked through a hyperlinking module 216 so that users can select a particular thread that they are interested in following.

In an illustrative embodiment of the clustering system 200B, each data object may be represented by a variable length vector containing 0 to N members. This data object is called the parent of these members. There may be two member functions that may be used. The first function may be a member importance function. Importance (M), which represents each member's importance value. The second function may be a member similarity function. Similarity (M1, M2), which may fall between 0 and 1. For example, a "0" value may mean that these two members. M1 and M2, are completely different. A value of "1" may mean that these two members. M1 and M2, are completely the same.

As used in the context of the present discussion, a cluster may contain a list of data objects, a list of all the members found in each of the data objects in the list, and a list of member representatives of the cluster that have a high importance value. The clustering module 214 may read in a collection of these data objects, classify them into an existing cluster, or create a new cluster as may be necessary.

One approach to deciding whether or not to create a new cluster may be as follows: Looping through each member that belongs to a data object, for each existing cluster, the clustering system 200B may calculate a similarity distance between the current member and the current cluster. For each representative member in the cluster, a similarity value may be calculated for the current member. The clustering module 214 of clustering system 200B may then find the closest representative member and its similarity value, and return this value.

Upon finding the closest cluster and its similarity value, the clustering system 200B may then determine whether the similarity value is smaller than a predetermined threshold. If it is, then the existing cluster may be updated (as explained in further detail below with reference to FIG. 3D). If not, a new cluster may be created.

In order to update an existing cluster, the clustering system 200B may determine if the member is new to the cluster. If it is, the member's weight may be set to its importance value, and this member may be added to the cluster's list of members. If it is not, the member's importance value may be added to its weight. The clustering system 200B may then sort the cluster's list of members by their respective weights.

Based on the weights, the most important members may be copied to the cluster's representative group. The member's parent data object may then be added to the cluster's list of data objects.

If a new cluster is to be created, the clustering system may initialize a new cluster and set the member's weight to its importance value. The member may then be added to the cluster's list of members and the cluster's representative group. The member's parent data object may then be added to the cluster's list of data objects.

Methods corresponding to and performed by the clustering system 200B will now be described in more detail with reference to FIGS. 3A to 3E.

Figure 3A:
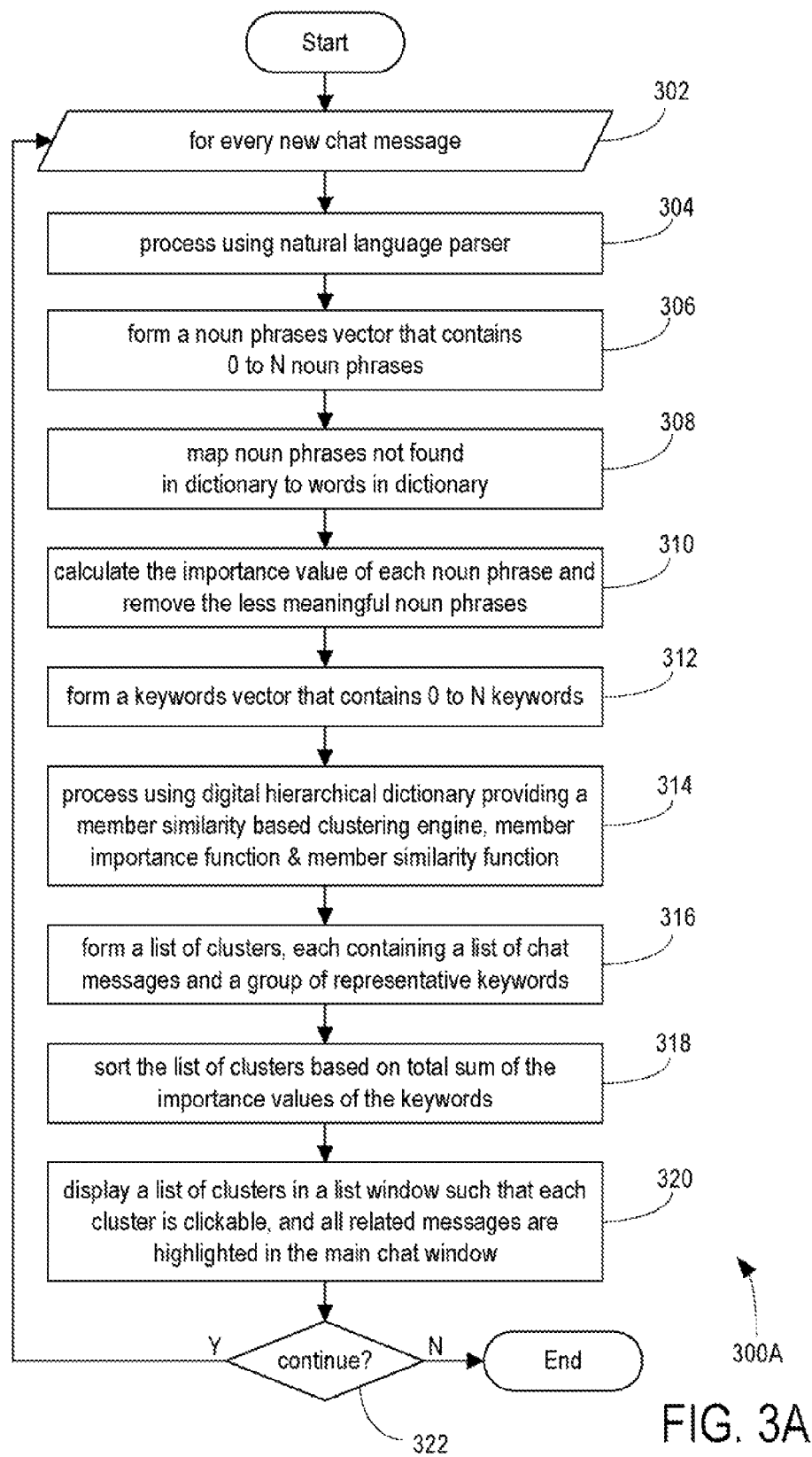
FIGS. 3A to 3E show flowcharts of methods in accordance with an embodiment.

Referring to FIG. 3A, shown is an illustrative clustering method 300A in accordance with an embodiment. Method 300A begins and at block 302 is set to repeat for every new chat message (e.g. see the chat messages in the main window of FIG. 2A).

At block 304, each new chat message entered by a user is parsed by a natural language processing engine (e.g. natural language processing engine 210 of FIG. 2B). By way of example, the GATE (General Architecture for Text Engineering) natural language engine may be used for this purpose. Method 300A then proceeds to block 306.

At block 306, the output from the natural language processing engine 210 is used to form a vector that may contain 0 to N words or phrases. In an embodiment, nouns identified by tire natural language processing engine 210 are used to form a nouns vector containing 0 to N nouns within a chat message. (It will be appreciated, however, verbs or a combination of nouns and verbs may also be used to form a corresponding nouns/verbs vector.) Method 300A then proceeds to block 308.

At block 308, a property table mapping common names to dictionary words is used to map nouns (or verbs) not defined in a dictionary to related words that can be found in the dictionary. Method 300A then proceeds to block 310.

At block 310, method 300A calculates an importance value for each noun (or verb) identified at block 308, and removes the less meaningful nouns (or verbs) based on the importance value calculations. An appropriate threshold importance value is set to determine a cut-off for nouns (or verbs) considered to have sufficient importance. In an embodiment, the threshold may be user adjustable.

In a preferred embodiment, the importance value of each noun (or verb) is calculated by its relative depth in a semantic hierarchical tree of a dictionary (e.g. hierarchical dictionary 212 of FIG. 2B). For example, a hierarchical tree dictionary such as WORDNET™ may be used. In the WORDNET dictionary, the word "bike" has a bigger importance value than the word "vehicle", as bike is a specific type of vehicle and therefore more descriptive.

At block 312, method 300A forms a keywords vector that contains 0 to N keywords. These keywords may include the nouns (or verbs) deemed to have a significant importance value for a cluster after less important nouns (or verbs) have been removed. Method 300A then proceeds to block 314.

At block 314, method 300A inputs the vector of keywords formed at block 312 to a member similarity-based clustering engine (e.g. clustering engine 214 of FIG. 2B). In the clustering engine 214, a keyword is treated as a member, and a member importance function is implemented based on the depth of the member in a semantic hierarchical tree of a dictionary. In an embodiment, the member similarity function may be implemented as a path distance in a semantic hierarchical tree of a dictionary. The process at block 314 is described in greater detail further below with respect to FIGS. 3B to 3E. Method 300A then proceeds to block 316.

At block 316, method 300A forms a list of clusters using the clustering engine 214. In the present illustrative example, each cluster contains a list of chat messages, a list of all keywords in its list of chat messages, and a list of representative keywords for the cluster. Method 300A then proceeds to block 318.

At block 318, method 300A sorts the list of clusters formed at block 316 based on the total sum of the importance value of keywords.

At block 320, method 300A displays the list of clusters in a window, such that each cluster is selectable (e.g. clickable using hyperlinks). Thus, if a user loses context in a session, the user can simply select a particular thread that he is interested in to highlight all the related messages. In alternative embodiments, these messages may be highlighted in a main chat window, or the non-related messages could be hidden, or the thread of interest could be shown in another window. Method 300A then proceeds to decision block 322 where method 300A either ends or continues with another new chat message by returning to block 302.

Figure 3B:
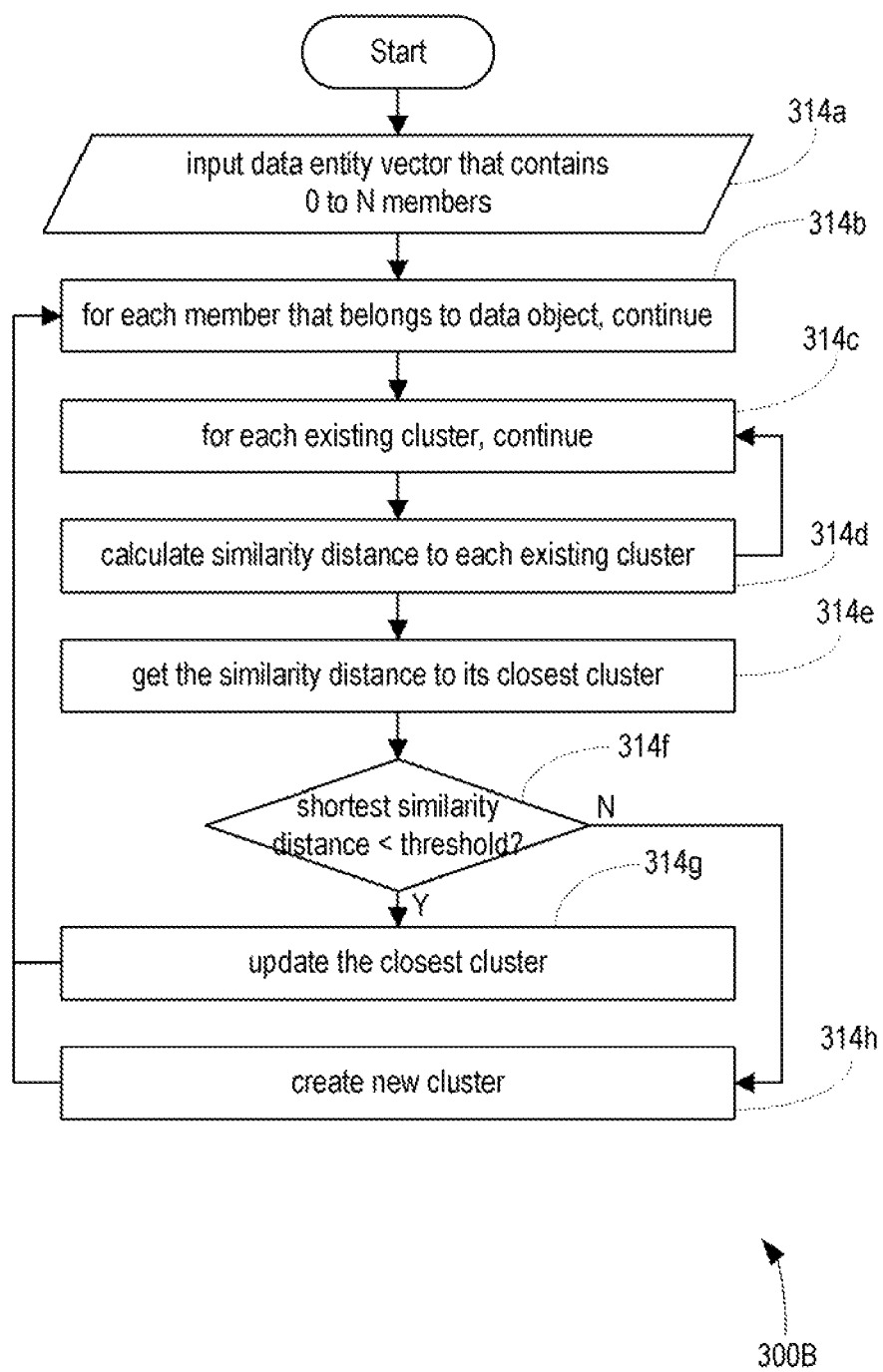

Now referring to FIG. 3B, a method 300B shows greater detail in the process at block 314 described above with reference to FIG. 3A. Method 300B begins at block 314a where method 300B inputs a data object (e.g. keywords) vector that contains 0 to N members. At block 314b, method 300B continues for each member that belongs to the keywords vector. At block 314c, method 300B continues for each existing cluster.

At block 314d, method 300B calculates a similarity distance to each existing cluster until there are no more existing clusters. The calculation of the similarity distance at block 314d is described in more detail below with respect to FIG. 3C.

At block 314e, method 300B obtains the similarity distance to the closest cluster of data objects, and proceeds to decision block 314f to determine if the shortest similarity distance is less than a predetermined threshold. If yes, method 300B updates the closest cluster at block 314g. The updating process at block 314g is described in detail further below with respect to FIG. 3D. If no, method 300B proceeds to block 314h to create anew cluster. The process for creating a new cluster is described in further detail below with respect to FIG. 3E.

Figure 3C:
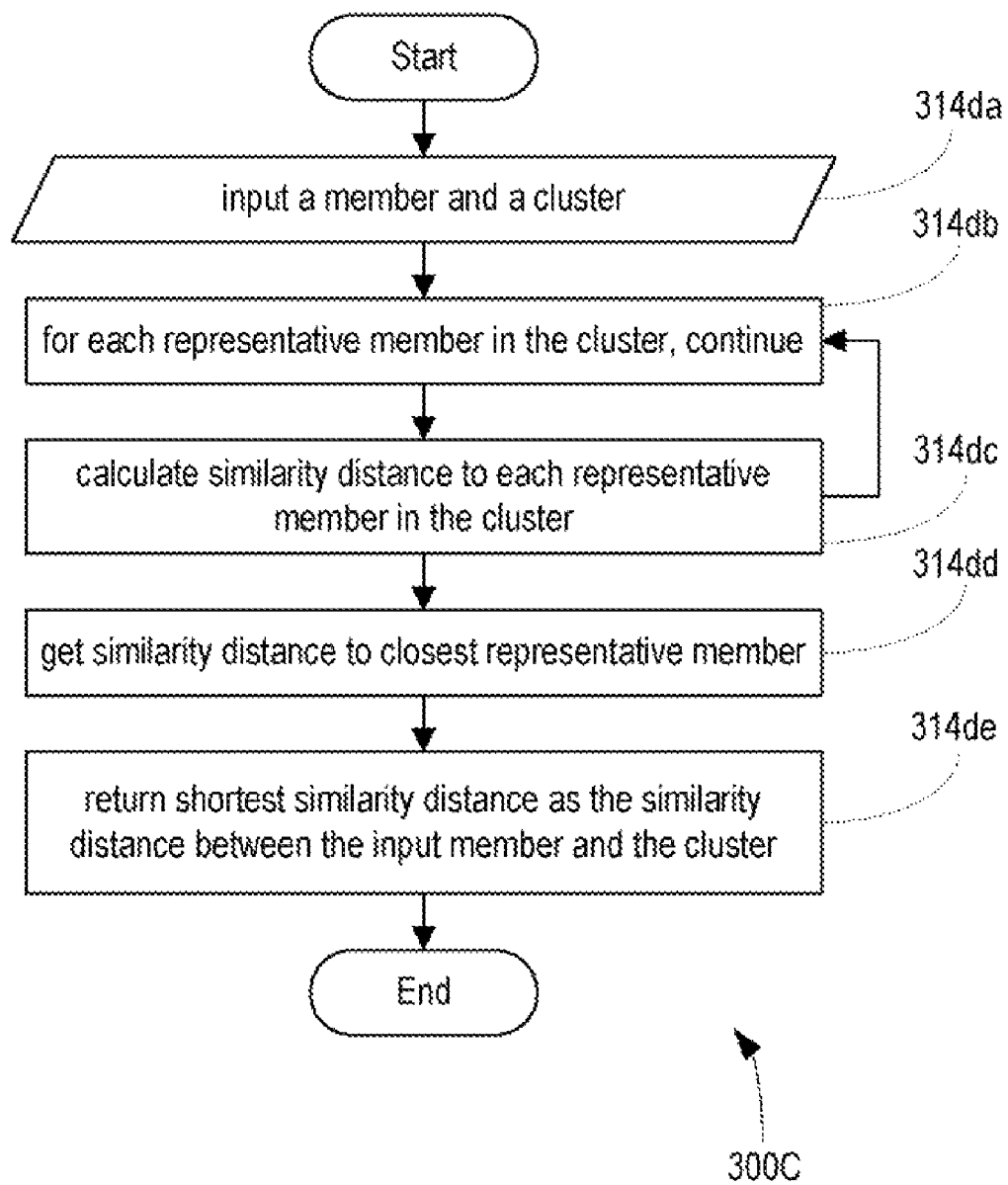

Now referring to FIG. 3C, method 300C shows the details of block 314d of FIG. 3B. Method 300C starts and at block 314da inputs a member and a cluster. At block 314db, method 300C is set to continue for each representative member in the cluster. At block 314dc, method 300C calculates a similarity distance to each representative member in the cluster. At block 314dd, method 300C obtains the similarity distance to the closest representative member in the cluster. Finally, at block 314de, method 300C returns the shortest similarity distance as the similarity distance between tire input member and the cluster.

Figure 3D:
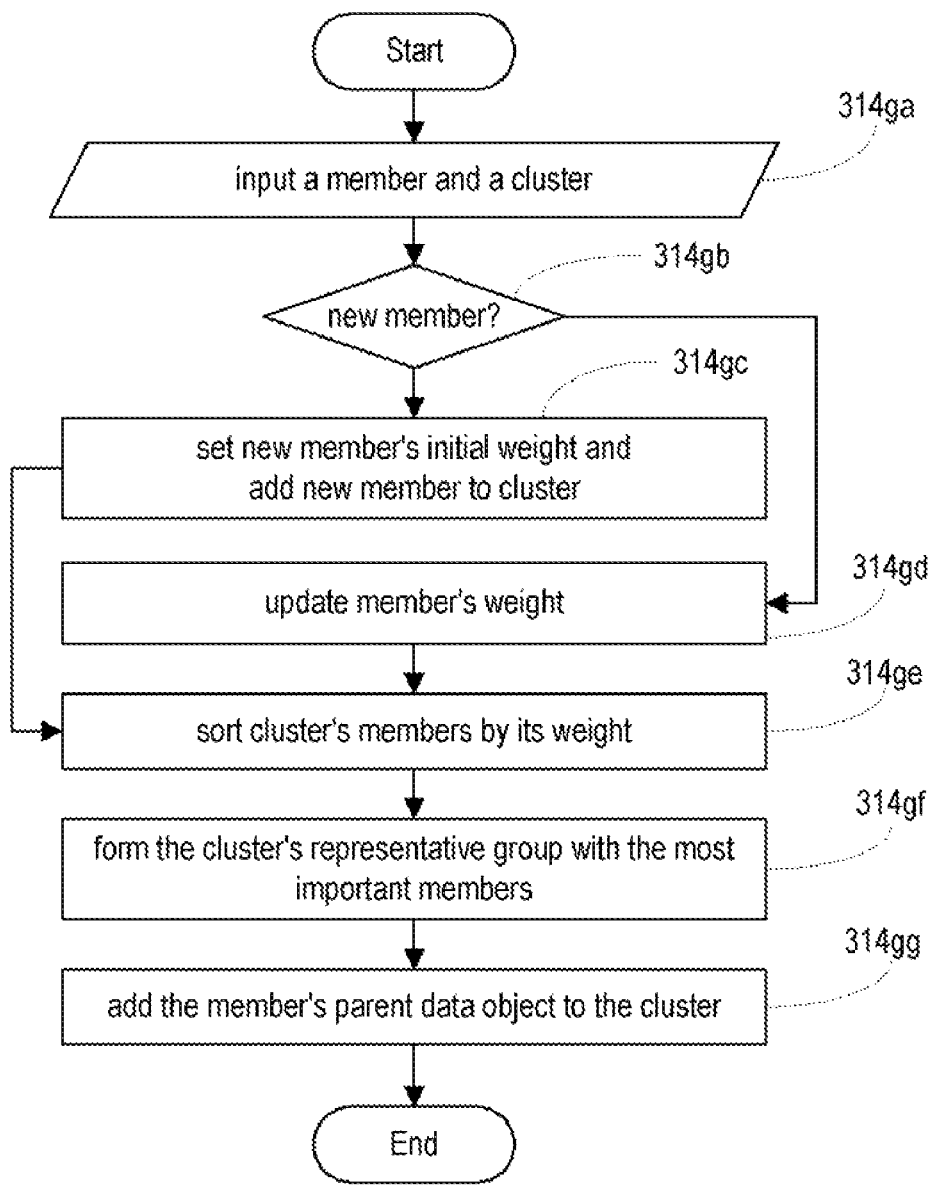

Now referring to FIG. 3D, method 300D shows details of the updating process at block 314g in FIG. 3B above. Method 300D starts and at block 314ga inputs a member and a cluster. At decision block 314gb, if the member is a new member, method 300D proceeds to block 314gc to set the new member's initial weight and add the new member to the cluster. If the member is not a new member, method 300D proceeds to block 314gd to update the member's weight.

At block 354ge, method 300D sorts the cluster's members by the cluster's total weight. At block 314gf, method 300D forms the cluster's representative group with the most important members (i.e. the representative keywords). Finally, at block 314gg, method 300D adds the member's parent data object (i.e. the chat message) to the cluster. Method 300D then ends.

Figure 3E:
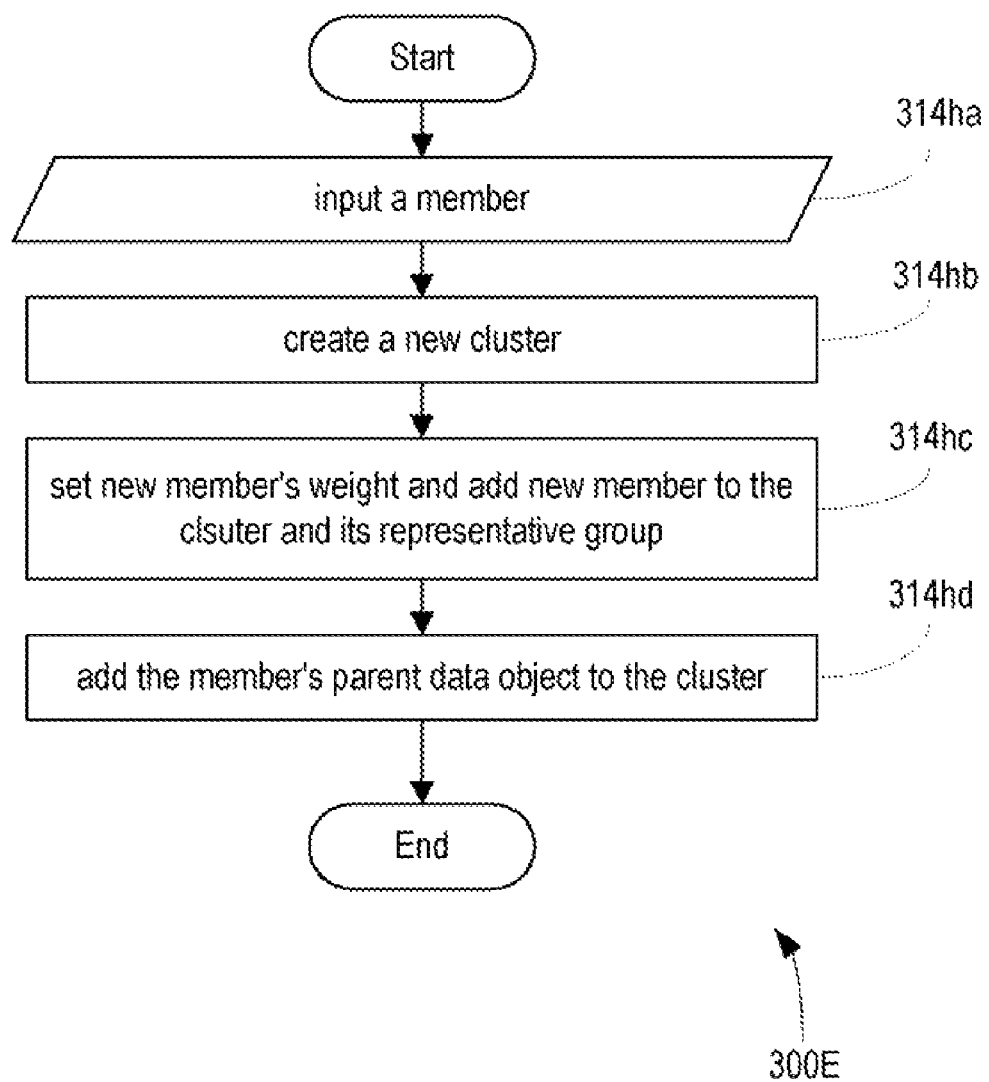

Now referring to FIG. 3E, method 300E shows a process for creating a new cluster at block 314h of FIG. 3B. Method 300E begins and at block 314ha inputs a member. At block 314hb, method 300E creates a new cluster. At block 314hc, method 300E sets a new member's weight and adds the new member to the cluster and its representative group. At block 314hd, method 300E adds the member's parent data object to the cluster. Method 300E then ends.

As will be appreciated, the above described clustering invention allows for the creation of new clusters when anew context (e.g. a new chat topic) is encountered. The class size of a resulting cluster can also be varied by adjusting the similarity threshold (with a lower threshold resulting in a larger class size).

It will also be appreciated that the above invention could also be used offline after the chat messaging session is over. Thus, this system and method could easily be adapted for use to cluster data objects in virtually any type of electronic text transcript. For example, in a possible embodiment, if part or all of the instant messaging content was captured for use in an email or document, the selectable context threads could be added so the recipient could quickly gain a better understanding of the transcript.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for unsupervised clustering data objects, comprising:

calculating, with a processor, based on a relative depth in a semantic hierarchical tree of a dictionary, an importance value of at least one member in a first data object represented as a variable length vector of 0 to N members, said vector further comprising a subset of said members having an importance value above a designated importance threshold, wherein the data objects comprise sentences and said members comprise words, therein;

calculating, with said processor, based on a path distance in said semantic hierarchical tree of a dictionary, a member similarity value for each member of said subset of said members to at least a second data object;

when none of said subset of said members of said first data object are associated with at least one of a subset of members of said at least a second data object, in dependence upon a comparison of similarity values, dynamically form, with a clustering module, a first cluster comprising said first data object; and when at least one of said subset of said members of said first data object is associated with at least one of a subset of members of said at least a second data object, in dependence upon a comparison of similarity values, dynamically form, with said clustering module, at least a second cluster comprising said first data object and said at least a second data object.

2. The method of claim 1, wherein said sentences comprise textual messages, and the method further comprises parsing said first data object utilizing a natural language parsing engine.

3. A computer program product for unsupervised clustering of data objects, the computer program product comprising:

a computer usable medium having computer usable program code embodied therewith, the computer usable program code comprising:

computer usable program code configured to calculate, based on a relative depth in a semantic hierarchical tree of a dictionary, an importance value of at least one member in a first data object represented as a variable length vector of 0 to N members, said vector further comprising a subset of said members having an importance value above a designated importance threshold, wherein the data objects comprise sentences and said members comprise words, therein;

computer usable program code configured to calculate, based on a path distance in said semantic hierarchical tree of a dictionary, a member similarity value for each member of said subset of said members to at least a second data object;

when none of said subset of said members of said first data object are associated with at least one of a subset of members of said at least a second data object, in dependence upon a comparison of similarity values, computer usable program code configured to dynamically form, with a clustering module, a first cluster comprising said first data object; and when at least one of said subset of said members of said first data object is associated with at least one of a subset of members of said at least a second data object, in dependence upon a comparison of similarity values, computer usable program code configured to dynamically form, with said clustering module, at least a second cluster comprising said first data object and said at least a second data object.

4. The computer program product of claim 3 wherein said sentences comprise textual messages, and the computer program product further comprises computer usable program code configured to parse said first data object utilizing a natural language parsing engine.

5. A method for unsupervised clustering of data objects, comprising:

calculating, with a processor, based on a relative depth in a semantic hierarchical tree of a dictionary, an importance value of at least one member in a first data object represented as a variable length vector of 0 to N members, said vector further comprising a subset of said members having an importance value above a designated importance threshold, wherein the data objects comprise sentences of an electronic messaging system and said members comprise words, therein;

calculating, with said processor, based on a path distance in said semantic hierarchical tree of a dictionary, a member similarity value for each member of said subset of said members to at least a second data object;

when none of said subset of said members of said first data object are associated with at least one of a subset of members of said at least a second data object, in dependence upon a comparison of similarity values, dynamically form, with a clustering module, a first cluster comprising said first data object; and when at least one of said subset of said members of said first data object is associated with at least one of a subset of members of said at least a second data object, in dependence upon a comparison of similarity values, dynamically form, with said clustering module, at least a second cluster comprising said first data object and said at least a second data object.

6. The computer system of claim 5, wherein said sentences of an electronic messaging system comprise sentences of an electronic chat system, and the processor is further programmed to parse the data objects with a natural language parsing engine.

7. The method of claim 1, further comprising linking each cluster to a group of data objects associated with the cluster.

* * * * *